(12) United States Patent
Bloom et al.

(10) Patent No.: US 8,970,827 B2
(45) Date of Patent: Mar. 3, 2015

(54) STRUCTURED LIGHT AND TIME OF FLIGHT DEPTH CAPTURE WITH A MEMS RIBBON LINEAR ARRAY SPATIAL LIGHT MODULATOR

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 11 days.

(21) Appl. No.: 14/033,147

(22) Filed: Sep. 20, 2013

(65) Prior Publication Data

US 2014/0211193 A1 Jul. 31, 2014

Related U.S. Application Data

(60) Provisional application No. 61/705,000, filed on Sep. 24, 2012.

(51) Int. Cl.
| | | |
|---|---|---|
| G01C 3/08 | (2006.01) | |
| F21K 99/00 | (2010.01) | |
| H04N 13/02 | (2006.01) | |
| G02B 26/08 | (2006.01) | |
| G02F 1/133 | (2006.01) | |
| G01B 11/25 | (2006.01) | |
| G06K 9/20 | (2006.01) | |

(52) U.S. Cl.
CPC ... *G01C 3/08* (2013.01); *F21K 9/58* (2013.01); *F21K 9/50* (2013.01); *H04N 13/0203* (2013.01); *G02B 26/0833* (2013.01); *G02F 1/13306* (2013.01); *H04N 13/0253* (2013.01); *G01B 11/2527* (2013.01); *G02B 26/0841* (2013.01); *G06K 9/2036* (2013.01)
USPC ....... 356/5.01; 356/3.01; 356/3.09; 356/4.01; 356/4.07; 356/5.09; 356/9; 356/625

(58) Field of Classification Search
CPC ......... G01S 17/10; G01S 7/497; G01S 17/89; G01S 7/487; G01C 3/08
USPC ........... 356/3.01, 3.09, 4.01, 4.07, 5.01, 5.09, 356/9, 625
See application file for complete search history.

(56) References Cited

U.S. PATENT DOCUMENTS

| | | | | |
|---|---|---|---|---|
| 2008/0247765 | A1* | 10/2008 | Mahgerefteh et al. | ........ 398/187 |
| 2008/0298424 | A1* | 12/2008 | Khan et al. | .................... 372/107 |
| 2009/0128833 | A1* | 5/2009 | Yahav | ............................ 356/623 |

(Continued)

OTHER PUBLICATIONS

Cho, Shung Han; Kwanghyuk Bae; Hyu-Min Kyung; Tae-Chan Kim. "Fast and Efficient Method to Suppress Depth Ambiguity for Time-of-Flight Sensors." Appeared in Consumer Electronics (GCCE), 2012 IEEE 1st Global Conference on Oct. 2-5, 2012. http://ieeexplore.ieee.org/xpls/icp.jsp?arnumber=6379648.*

(Continued)

*Primary Examiner* — Luke Ratcliffe
*Assistant Examiner* — Samantha K Abraham
(74) *Attorney, Agent, or Firm* — NUPAT, LLC; Morrison Ulman (57) ABSTRACT

A fast spatial light modulator based on a linear MEMS ribbon array enables a depth capture system to operate in structured light and time-of-flight modes. Time-of-flight depth information may be used to phase unwrap structured light depth information. Combined structured light and time-of-flight systems offer precise depth resolution over a wide range of distances.

17 Claims, 9 Drawing Sheets

(56) References Cited

U.S. PATENT DOCUMENTS

2009/0147154 A1* 6/2009 Arai et al. ............ 348/750
2010/0149548 A1* 6/2010 Shmarev et al. ............ 356/517
2011/0114856 A1* 5/2011 Cooke ............ 250/492.22
2011/0123183 A1* 5/2011 Adelsberger et al. ......... 396/164
2014/0002887 A1* 1/2014 Yeung ............ 359/291

OTHER PUBLICATIONS

Su, Xianyu; Qican Xhang. "Dynamic 3-D Shape Measurement Method: A Review." Appeared in Optics and Lasers in Engineering Journal. May 8, 2009. http://hanquier.m.free.fr/Worcester/references/Others%20papers/dynamie/%203D%20shape.pdf.*

* cited by examiner

STRUCTURED LIGHT AND TIME OF FLIGHT DEPTH CAPTURE WITH A MEMS RIBBON LINEAR ARRAY SPATIAL LIGHT MODULATOR

RELATED APPLICATIONS

This application claims priority benefit from U.S. 61/705,000, "Structured light systems", filed on Sep. 24, 2012 and incorporated herein by reference.

TECHNICAL FIELD

The disclosure is related to optical depth capture systems based on linear arrays of micro-electromechanical (MEMS) ribbons.

BACKGROUND

Depth capture refers to systems and techniques that use light projectors and cameras to obtain three-dimensional information about a scene. A depth capture, three-dimensional image of a person's face, for example, includes X, Y and Z coordinates of points that lie on surface features such as the eyes, nose and mouth.

Depth capture systems facilitate richer human-machine interactions such as gesture inputs for computer software. Machine inputs that are made with computer mice or TV remote controls today may be replaced by gestures such as waving or throwing motions in the future. Depth capture is valuable in manufacturing where robots need precise three-dimensional coordinates of products they are assembling. Depth capture may also be used to take body measurements for custom fit clothing or to locate body parts during robotic surgical procedures.

Two common depth capture techniques are structured light and time-of-flight. In structured light a known light pattern is projected onto an object. The surface contours of the object make the pattern appear distorted when viewed with a camera at a vantage point separated from the pattern projector by a baseline distance. Using geometrical relationships, the distortions are used to determine the distance from the projector to points on the object. Time-of-flight is based on measuring the time required for light to travel from a light source to an object and back to a camera. The farther away the object is, the longer the light takes to make the round trip.

Structured light systems generally offer more precise depth measurements than time-of-flight systems and are more commonly used when the object of interest is nearby. Time-of-flight systems are usually not as precise, but work over greater distances than structured light. There are many other tradeoffs that make one type of depth capture system more suitable than another for a particular task.

What are needed are depth capture systems and techniques that include the best characteristics of structured light and time-of-flight.

DETAILED DESCRIPTION

Depth capture systems and techniques described below use MEMS-ribbon linear-array spatial light modulators. These modulators are so fast that they may be operated to produce light modulation for time-of-flight measurements as well as structured light patterns. One modulator can serve both functions. As described below, a combined structured light/time-of-flight system may use time-of-flight techniques to perform phase unwrapping for structured light three-dimensional images. Aspects of structured light and time-of-flight systems are considered separately before a combined system is described.

Figure 1:
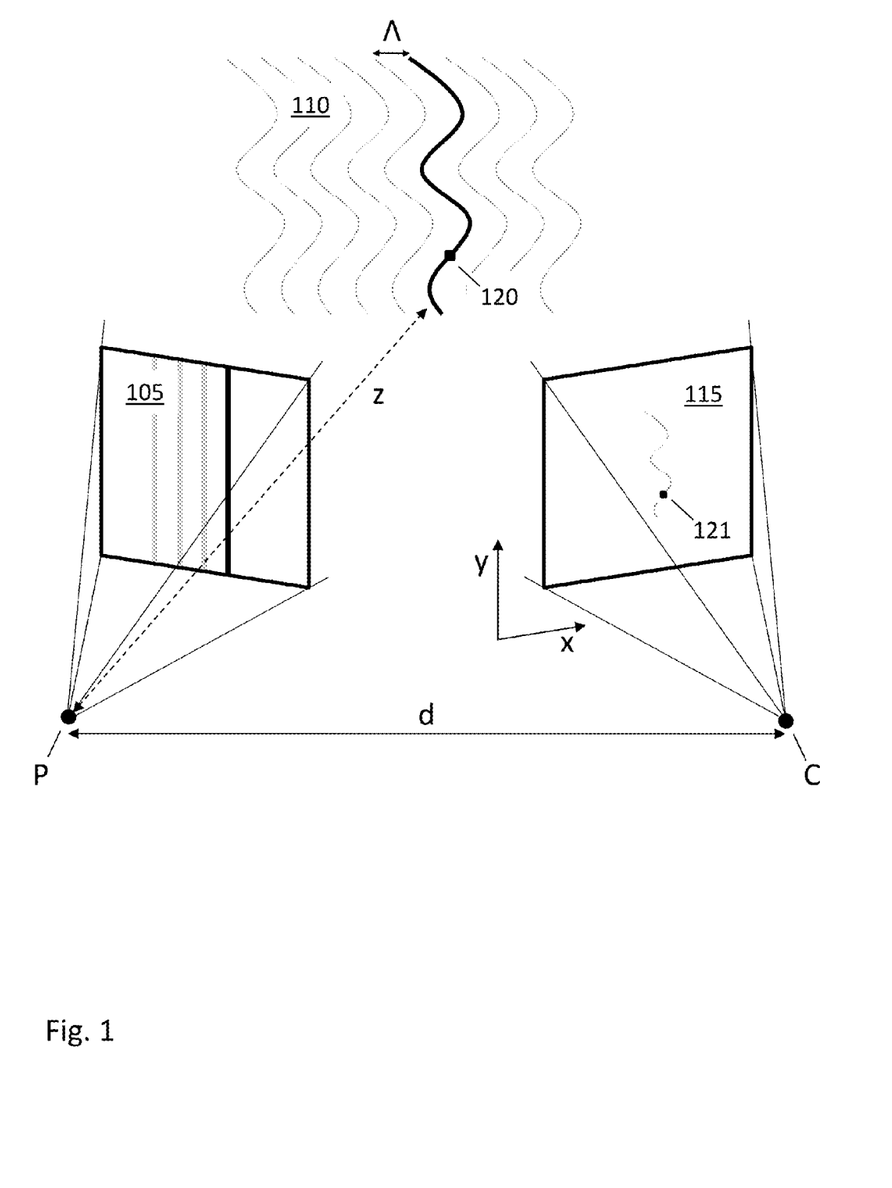
FIG. 1 is a conceptual diagram of a structured light depth capture system.

FIG. 1 is a conceptual diagram of a structured light depth capture system. In FIG. 1 a pattern projector located at point "P" generates a sinusoidal stripe pattern 105 that illuminates a three-dimensional surface located a distance, z, away from the projector. A camera located at point "C" views the pattern 110 that stripes 105 make when they illuminate the surface. The camera records the (X, Y) location of points in pattern 110 as they appear on the camera's image sensor 115. For example point 120 on the surface corresponds to point 121 in the camera. The camera is separated from the projector by baseline distance, d. The depth resolution, Δz, of the system is given approximately by:

$$\Delta z = \frac{\Lambda}{2\pi}\left(\frac{z}{d}\right)\Delta\phi.$$

Here, Λ is the period, and φ is the spatial phase, of pattern 110. The precision with which the phase of pattern 110 is resolved leads directly to the precision of depth information obtained by the system. As an example, if Λ=1 cm, z=1 m, d=10 cm and phase resolution Δφ=2π/100, then the depth resolution Δz=1 mm. However, the system suffers from a depth ambiguity having a period of (Λz/d)=10 cm. Said another way, the spatial phase of pattern 110 is the same for surfaces whose distance, z, differ by a multiple of 10 cm. Thus it may be hard to distinguish an object at 48.3 cm from one at 58.3 cm, for example.

Processes for resolving depth ambiguities are sometimes referred to as "phase unwrapping" because the phase of the spatial pattern repeats or "wraps around" every 2π. One method of phase unwrapping involves observing several different patterns having different spatial periods Λ. The Chinese remainder theorem can be used as an aid to phase unwrapping using this method. Of course, multiple observations take more time than observing only one pattern.

Figure 2:
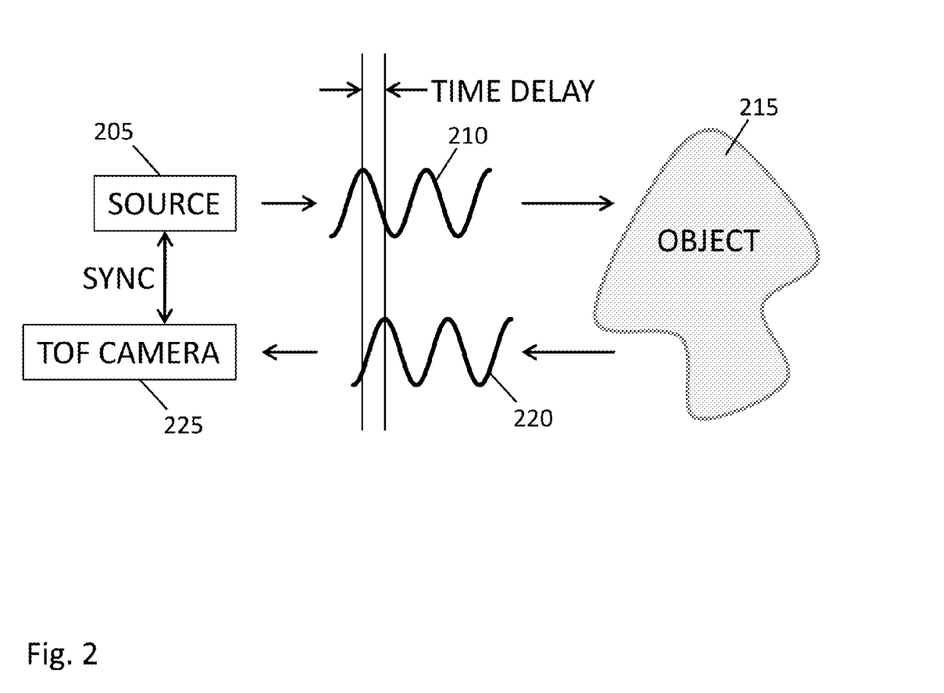
FIG. 2 is a conceptual diagram of a time-of-flight depth capture system.

FIG. 2 is a conceptual diagram of a time-of-flight depth capture system. In FIG. 2, light source 205 emits modulated light 210 that is incident upon object 215. Modulated light 220 is reflected from the object and recorded by time-of-flight camera 225. Light source 205 may be a laser, light-emitting diode or other light source. The source includes a radio frequency modulator to produce amplitude modulated light 210. The modulation frequency typically falls in the range from approximately 1 MHz to approximately 100 MHz with corresponding modulation wavelengths of 300 meters to 3 meters.

A time-of-flight camera is one in which each pixel of the camera's image sensor is operable as a phase sensitive detector. The camera may include onboard or external processors and memory. "SYNC" represents an electronic signal carrying the modulation frequency and phase of light source 205. (The SYNC arrow is double-headed as the timing source may be in the light modulator or the camera depending on the particular time-of-flight system.)

The time required for light to travel from the source to the object and back to the time-of-flight camera is indicated in the figure as "TIME DELAY". The delay is equal to twice the distance from the source to the object divided by the speed of light. The corresponding modulation phase delay is:

$$\phi = 2z \cdot \left(\frac{2\pi}{\lambda}\right)$$

Here z is the distance from the source to the object and $\lambda = f/c$ is the modulation wavelength (f is the modulation frequency and c is the speed of light).

As an example, if the modulation frequency is 20 MHz and the time-of-flight camera resolves the phase of the modulation of the reflected light with a precision of $2\pi/100$, then the depth resolution is 7.5 cm, independent of distance to the object. Using phase sensitive detection techniques, the system has a depth ambiguity every 7.5 m. The modulation phase returned from 15 m is the same as that returned from 22.5 m.

Structured light and time-of-flight offer complementary performance. Following the examples given above, a structured light system with a depth ambiguity every 10 cm could take advantage of time-of-flight depth information with a depth resolution of 7.5 cm. If the structured light system is restricted to viewing objects nearer than 7.5 m, then time-of-flight measurements may be used to unambiguously determine which structured light depth period applies. For example, structured light may determine the distance to a surface as being part of the set { . . . , 0.8355 m, 0.9355 m, 1.0355 m, 1.1355 m, . . . } which contains distances differing from one another by multiples of 10 cm. Time-of-flight measurements with 7.5 cm resolution may be used to pick the correct structured light measurement. This concept may be applied to every pixel in an image acquired with a time-of-flight camera.

Including a radio frequency light modulator and a spatial light modulator in one system is not always possible. A spatial light modulator based on MEMS-ribbon linear-array technology is fast enough, however, to perform both functions. As used here, a "fast" spatial light modulator or "FAST SLM" refers to a MEMS-ribbon linear-array spatial light modulator.

Figure 3:
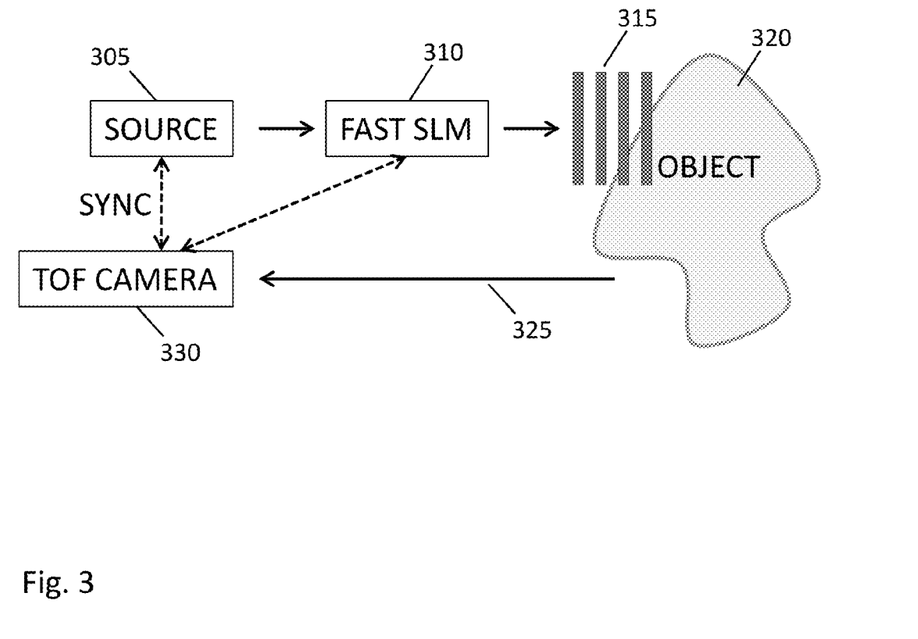
FIG. 3 is a conceptual diagram of a combined structured light and time-of-flight depth capture system.

FIG. 3 is a conceptual diagram of a combined structured light and time-of-flight depth capture system. In FIG. 3, light from light source 305 is modulated by fast spatial light modulator 310. (In some cases, light source 305 may also include a radio frequency amplitude modulator.) Modulated light, which may take the form of patterns such as pattern 315 or have no spatial variation ("full field") but be amplitude modulated, is incident upon object 320. Light 325, reflected by the object, is detected by time-of-flight camera 330.

Since a time-of-flight camera is one in which each pixel of the camera's image sensor is operable as a phase sensitive detector, camera 330 may be used to demodulate spatial patterns such as 315 or temporal signals such as radio frequency amplitude modulation of a light beam. "SYNC" indicates that frequency and phase information may be communicated between the time-of-flight camera and the fast spatial light modulator or between the time-of-flight camera and a radio frequency amplitude modulator associated with light source 305.

When spatial pattern data is sent to FAST SLM 310, the modulator acts as a spatial light modulator. However, FAST SLM 310 may also modulate each pixel in the same way, effectively acting as a radio frequency amplitude modulator. MEMS-ribbon linear-array light modulators that are not optimized for this application can modulate light as fast as 2 to 5 MHz; extension to modulation frequencies around 20 MHz is straightforward.

Figure 4:
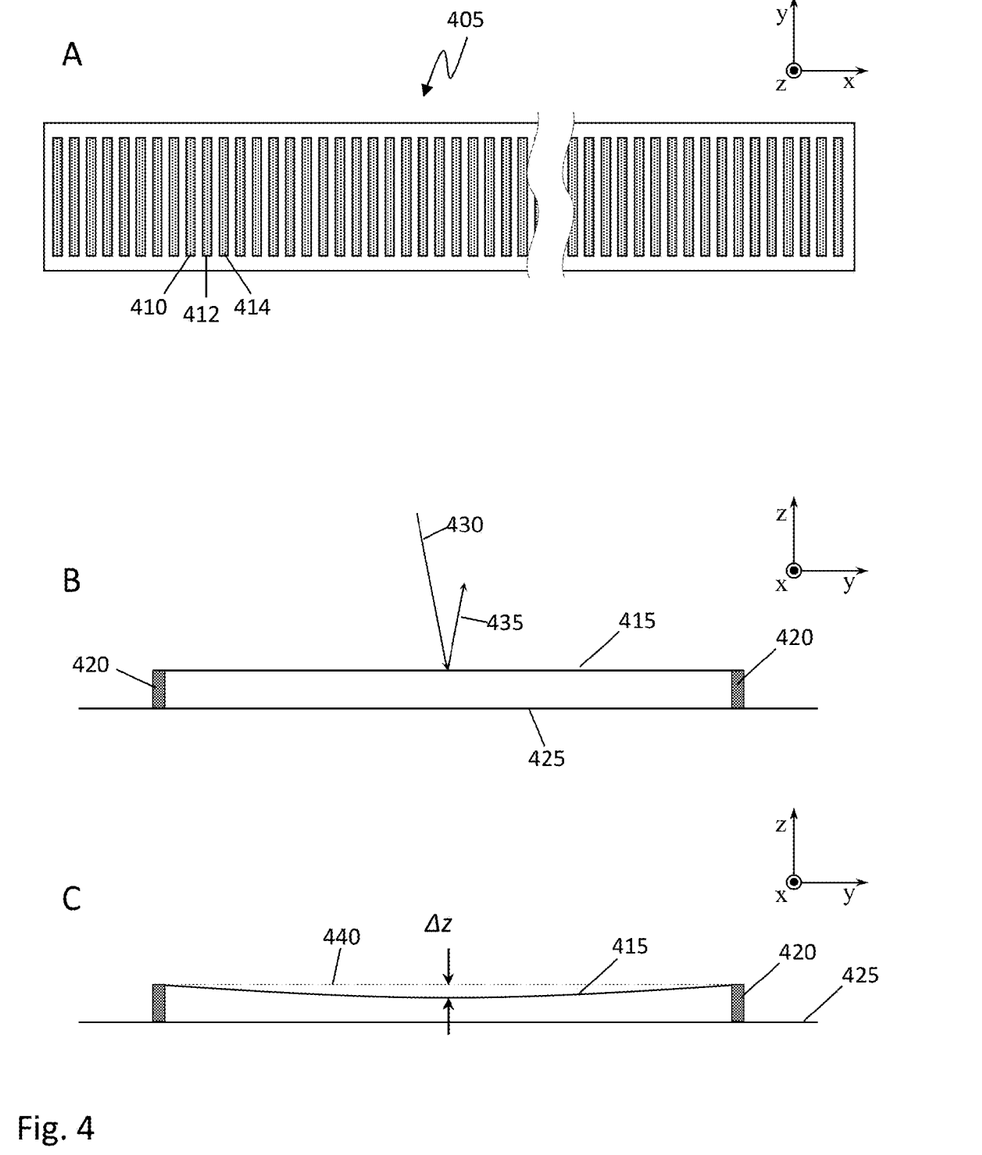
FIG. 4 illustrates a linear MEMS-ribbon array.

FIG. 4A illustrates a linear MEMS-ribbon array 405. A typical array of the type illustrated in FIG. 4 contains roughly a few hundred to roughly a few thousand ribbons such as ribbons 410, 412, and 414. Coordinate axes are provided with FIG. 4A to facilitate comparison with FIGS. 4B and 4C. Although ribbon dimensions may vary widely depending on particular applications, typical ribbons are roughly 100 to 300 microns long (y-direction), roughly 2 to 6 microns wide (x-direction), and roughly 0.1 to 0.3 microns thick (z-direction). Ribbons may be made from high-stress silicon nitride coated with aluminum or other materials to enhance optical reflectivity.

FIGS. 4B and 4C show a side view of a single MEMS ribbon at rest and under the influence of an applied voltage, respectively. Ribbon 415 is supported by end-supports 420 over substrate 425. In FIG. 4B light ray 430 arrives at approximately normal incidence to ribbon 415 and is reflected as light ray 435. In FIG. 4B, ribbon 415 is at rest, not under the influence of external forces. In FIG. 4C, a voltage has been applied between ribbon 415 and substrate 425. The voltage pulls the ribbon from its rest position 440 toward the substrate by an amount, $\Delta z$, as shown in the figure. The optical phase, $\phi$, of a light ray reflected from a ribbon depends on the displacement, $\Delta z$, according to $$\phi = \phi_0 = 2\left(\frac{2\pi}{\lambda}\right)\Delta z.$$

Here $\phi_0$ is the optical phase of a ray reflected from the ribbon when it is in its rest position and $\lambda$ is the wavelength of light.

Figure 5:
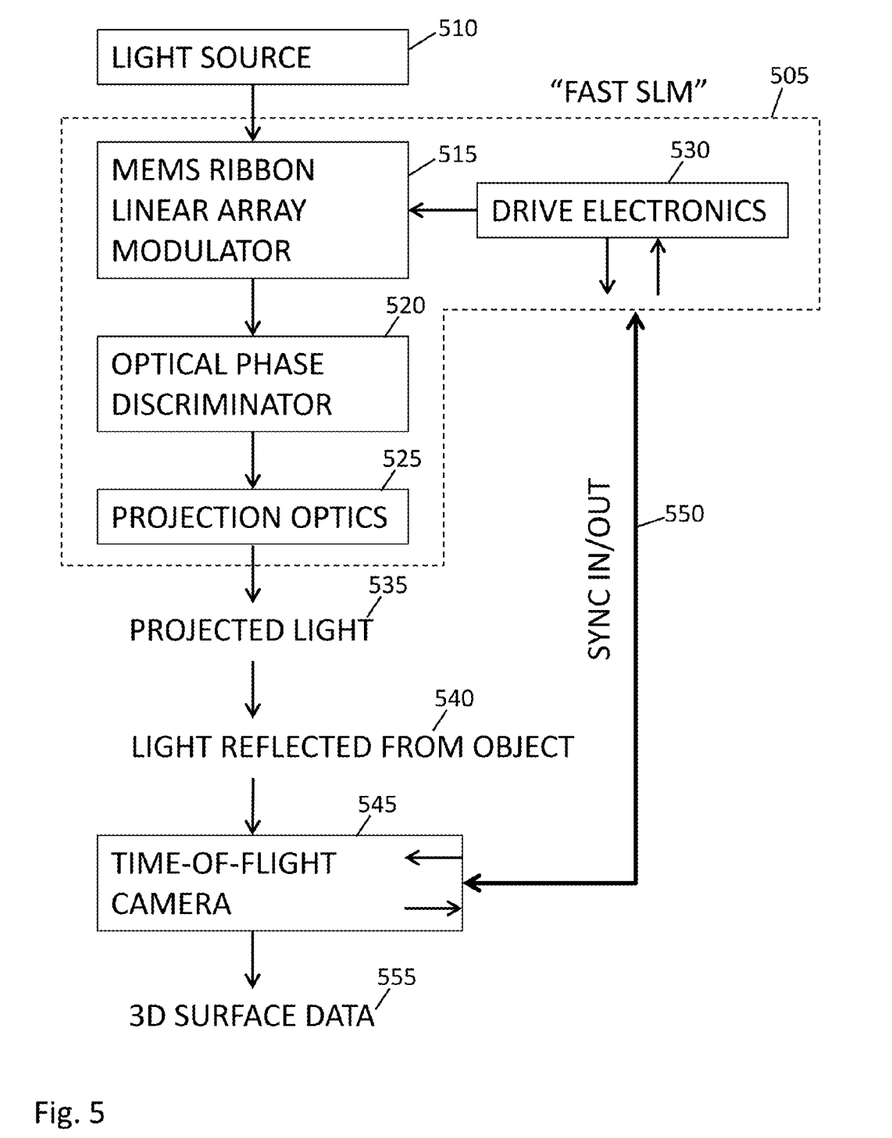
FIG. 5 is a block diagram of a combined structured light and time-of-flight depth capture system.

FIG. 5 is a block diagram of a combined structured light and time-of-flight depth capture system. The system is built around a "FAST SLM" 505. Major components of the system include light source 510, MEMS-ribbon linear-array modulator 515, optical phase discriminator 520, projection optics 525, drive electronics 530 and time-of-flight camera 545. Briefly, fast spatial light modulator 505 modulates light from light source 510 to produce projected light 535. Light reflected from an object 540 is detected by time-of-flight camera 545. The camera shares modulation frequency and phase information via a SYNC connection 550 with the drive electronics 530 of fast spatial light modulator 505. The output of the camera is three-dimensional surface data 555. The camera may include onboard or external processors and memory to aid in producing or processing three-dimensional surface data.

Light source 510 may be a laser or a light emitting diode. In many embodiments of a combined structured light/time-of-flight system the light source is continuous; however, as described in greater detail below, some operating modes may make use of a radio frequency amplitude modulator optionally included with the light source. (In that case modulation phase and frequency information is shared between the modulated light source and the time-of-flight camera.) MEMS-ribbon linear array is an array such as that discussed in connection with FIG. 4. Optical phase discriminator 520 converts phase modulation imparted by the MEMS-ribbon linear array into amplitude modulation of light. Examples of suitable phase discriminators are described in "Differential interferometric light modulator and image display device" (U.S. Pat. No. 7,054,051), "Polarization light modulator" (U.S. Pat. No. 7,286,277), "Display system" (U.S. Pat. No. 7,940,448), and "Compact display system" (U.S. Pat. No. 7,940,449).

Projection optics 525 include lenses for projecting patterns produced by phase modulator 515 and phase discriminator 520. In structured light applications a two dimensional projected image that varies in only one dimension, such as a stripe or bar pattern, may be obtained from a one-dimensional or linear array without scanning by using cylindrical projection lenses. Drive electronics 530 convert spatial pattern data or full-field modulation data into electrical signals that drive ribbons in array 515. The drive electronics may include digital-to-analog converters to generate analog ribbon driving voltages or may be based on techniques that produce analog ribbon movements directly from digital on/off drive voltages.

A system such as that of FIG. 5 may be operated in several different combined structured light and time-of-flight depth capture modes. Three of these are summarized in FIGS. 6, 7 and 8. In each mode, structured light and time-of-flight techniques are used to obtain depth information. Time-of-flight measurements are used to phase unwrap structured light data. The three modes differ primarily in how time-of-flight measurements are obtained.

Figure 6:
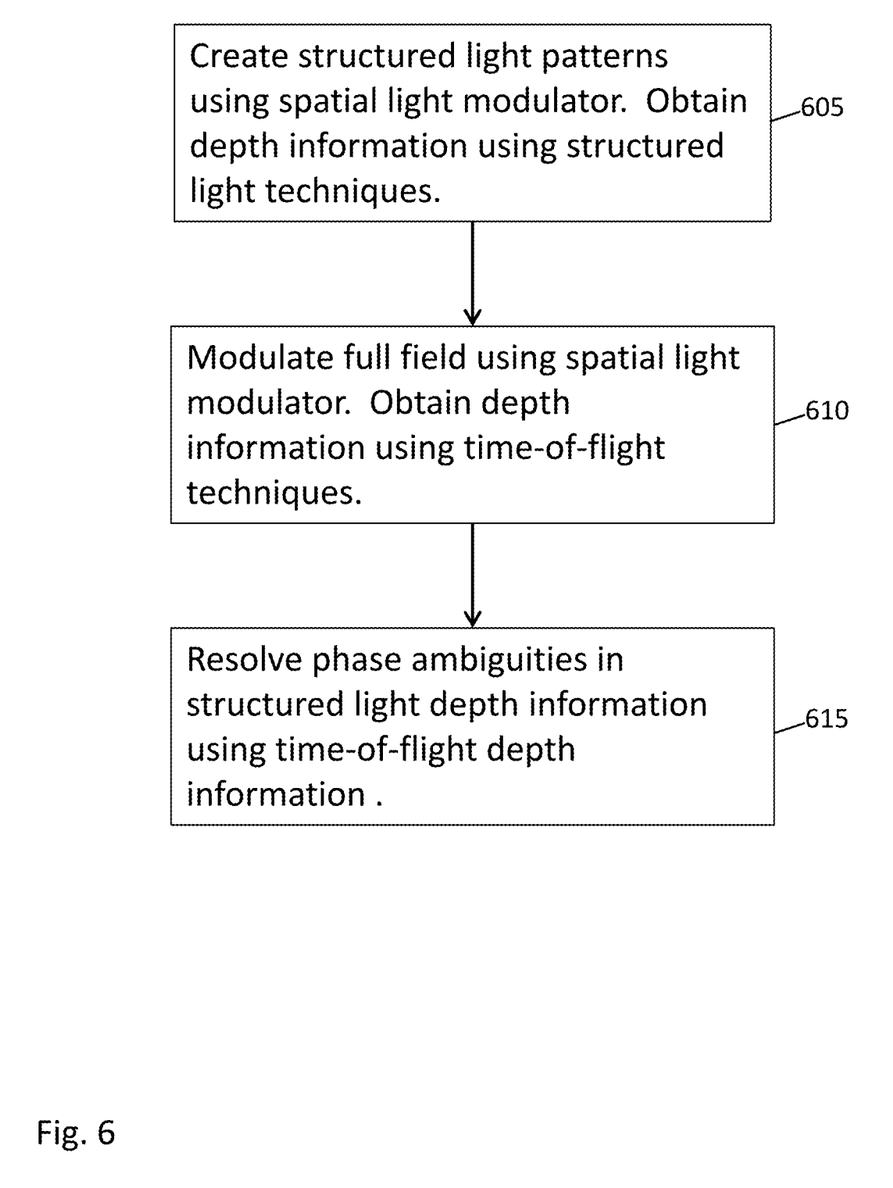
FIG. 6 is a flow chart for a first combined structured light and time-of-flight depth capture method.

FIG. 6 is a flow chart for a first combined structured light and time-of-flight depth capture method. In FIG. 6, step 605 is creating structured light patterns using a spatial light modulator and obtaining depth information using structured light techniques. This step may be implemented, for example, by projecting stripe or bar patterns and observing them with a camera separated from the projector by a baseline distance. Step 610 is modulating the full field using a spatial light modulator and obtaining depth information using time-of-flight techniques. This step may be implemented using a fast spatial light modulator based on a MEMS-ribbon linear-array. Step 610 may not be implemented using a conventional digital light processor or liquid crystal on silicon two-dimensional spatial light modulator. These types of modulators are far too slow for practical use in time-of-flight applications. Once depth information has been obtained by structured light (605) and time-of-flight (610), phase ambiguities in the structured light depth information may be resolved using time-of-flight depth information. This is possible whenever the range of depths of interest falls within one time-of-flight depth ambiguity distance as is the case in the examples discussed above.

The method of FIG. 6 may be implemented such that structured light and time-of-flight measurements are alternated repeatedly as suggested by the order of steps in the figure. Alternatively, time-of-flight techniques may be used only as necessary. For example, once the depth of an object has been determined unambiguously, the object may be tracked using structured light techniques alone as long as the object does not disappear from view or change distance from the camera too quickly.

Figure 7:
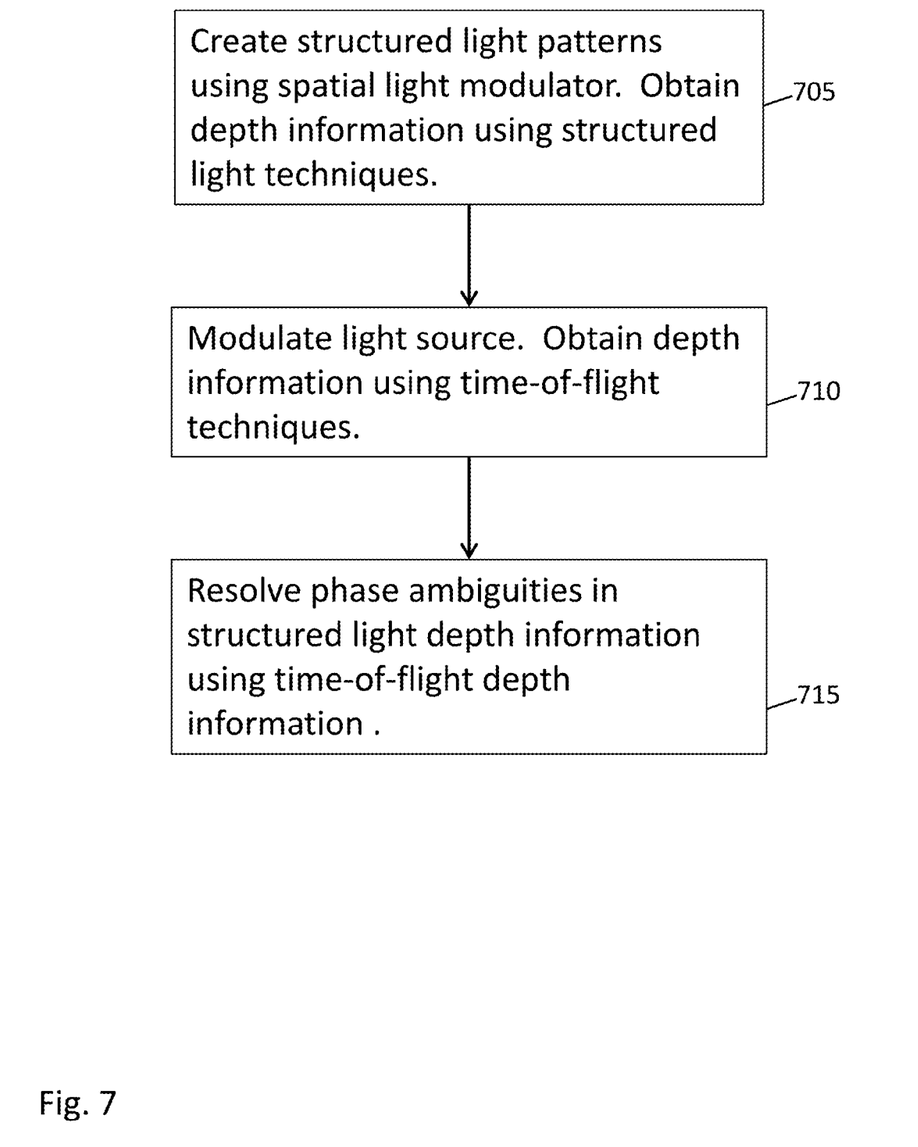
FIG. 7 is a flow chart for a second combined structured light and time-of-flight depth capture method.

FIG. 7 is a flow chart for a second combined structured light and time-of-flight depth capture method. This method is similar to the method of FIG. 6 except that in the method of FIG. 7, the light source is modulated by a radio frequency amplitude modulator separate from the spatial light modulator. In FIG. 7, step 705 is the same as step 605 of FIG. 6. Step 710 is modulating a light source and obtaining depth information using time-of-flight techniques. In this case the light source is modulated directly; for example a diode laser or light emitting diode may be driven by a radio frequency signal. Step 715 is the same as step 615 of FIG. 6.

Compared to the method of FIG. 6, the method of FIG. 7 requires a more complicated light source since it includes radio frequency modulation instead of being a continuous source. The approach of FIG. 7 may be preferred when high time-of-flight modulation frequencies, e.g. greater than 20 MHz, are desired.

Figure 8:
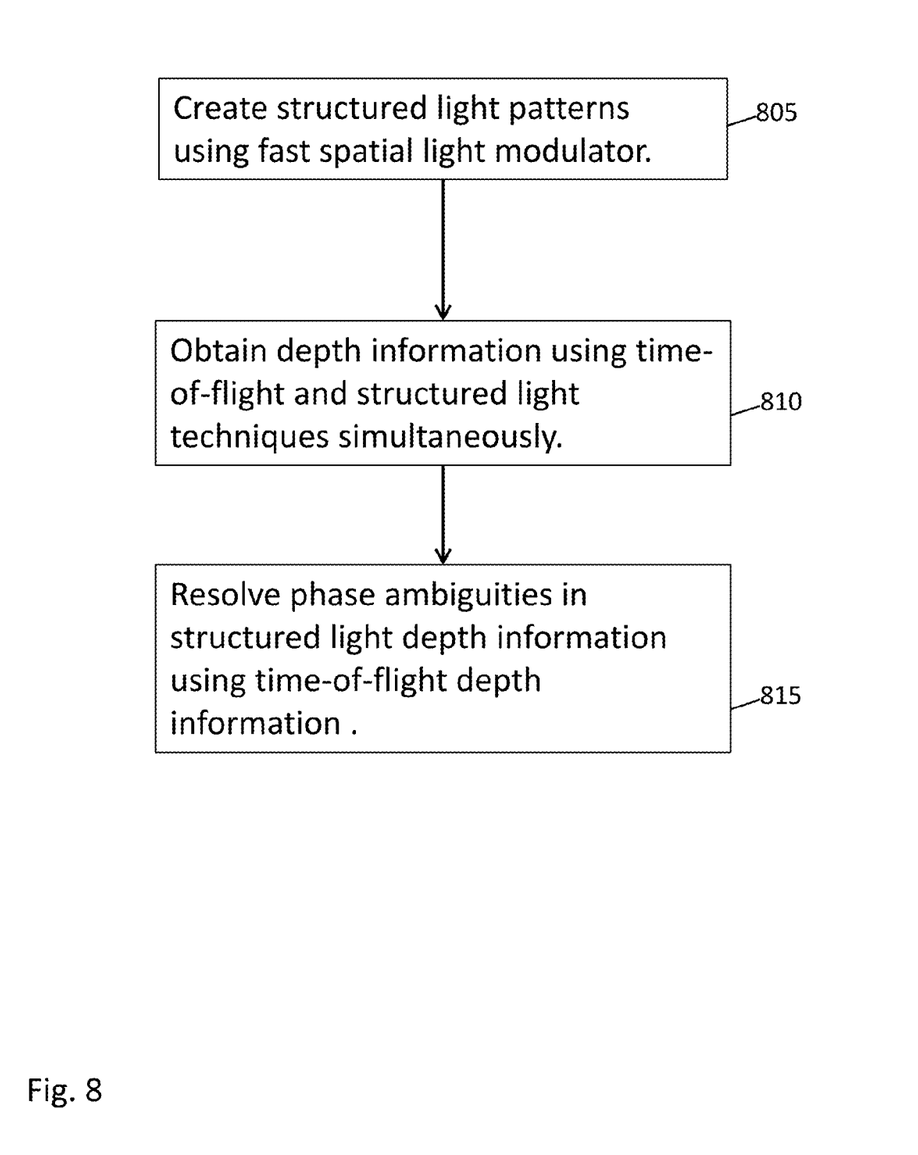
FIG. 8 is a flow chart for a third combined structured light and time-of-flight depth capture method.

FIG. 8 is a flow chart for a third combined structured light and time-of-flight depth capture method. In FIG. 8, step 805 is creating structured light patterns using a fast spatial light modulator such as a MEMS-ribbon linear array. Step 810 is obtaining depth information using time-of-flight and structured light techniques simultaneously. Step 815 is the same as step 715 in FIG. 7 and step 615 in FIG. 6.

A fast spatial light modulator may be used to produce two dimensional light patterns, such as stripes or bars, which have only one dimensional variation. A set of such patterns representing four spatial phases is often used for structured light applications. The same set of patterns may be used for time-of-flight purposes when data from spatial phases separated by $\pi$ are combined. This leaves two sets of data corresponding to an all-bright field and an all-dark field, which is the modulation pattern needed for time-of-flight measurements. This technique works when the spatial light modulator produces spatial patterns at a rate that is fast enough for practical time-of-flight use. For example a spatial light modulator that produces phases of a spatial light pattern at 4 MHz simultaneously produces time-of-flight modulation at 2 MHz when phases separated by $\pi$ are summed.

Thus, depth capture systems based on MEMS-ribbon linear-array spatial light modulators may be operated in several different, combine structured light/time-of-flight modes to obtain precise and unambiguous depth information.

Figure 9:
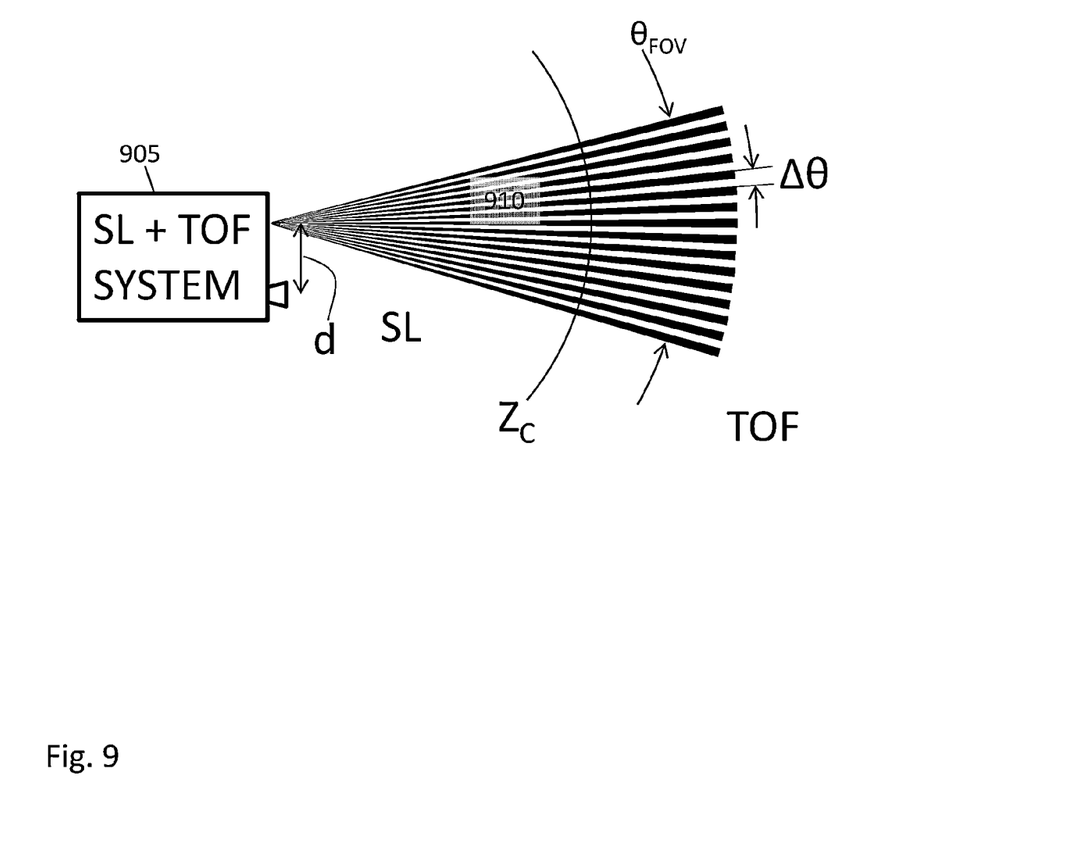
FIG. 9 is a conceptual diagram of a combined structured light and time-of-flight depth capture system.

A combined structured light and time-of-flight depth capture system—based on any underlying structured light technology—may also be used to improve overall system depth dynamic range. A combined system operates in structured light mode when viewing near objects and in time-of-flight mode when viewing far objects. FIG. 9 is a conceptual diagram of such a system.

In FIG. 9, combined structured light and time-of-flight system 905 includes a ribbon-array structured light system as described above or a conventional structured light system such as a pattern projector based on a digital micromirror array or liquid crystal on silicon array. System 905 also includes a time-of-flight depth capture system.

As discussed above the depth resolution of the structured light system is given approximately by:

$$\Delta z_{SL} = \frac{z}{d}\left(\frac{\Lambda}{2\pi}\right)\Delta\phi$$

The depth resolution of the time-of-flight system is given by:

$$\Delta z_{TOF} = \frac{1}{2}\left(\frac{\lambda}{2\pi}\right)\Delta\phi$$

It is apparent that when z is larger than a "crossover" distance, $z_C$, the depth resolution of the structured light system becomes worse than that of the time-of-flight system. The two expressions for depth resolution may be combined to find the crossover distance:

$$z_C = \sqrt{\frac{d\lambda}{2\cdot\Delta\theta}}$$

Here we have used $\Lambda \cong z \cdot \Delta\theta$ where $\Delta\theta$ is the angle subtended by one period of structured light pattern 910. Equivalently, $\Delta\theta$ is equal to the field of view of the structured light projector divided by the number of pattern periods projected. Structured light baseline d, $\Delta\theta$, field of view $\theta_{FOV}$, and $z_C$ are shown in FIG. 9. $\lambda$ is the modulation wavelength of the time-of-flight system. If d=10 cm, $\lambda$=15 m, and 64 pattern periods are projected in a 50° field of view, then $z_C$=7.43 m.

The system of FIG. 9 may be operated in manual or automatic modes. In manual mode a user selects whether to use structured light or time-of-flight techniques to obtain depth information. In automatic mode a controller in the system chooses structured light or time-of-flight. The controller is connected to the structured light and time-of-flight subsystems and chooses which one to use for depth capture based on the distance of detected objects: If the objects are closer than the crossover distance, $z_C$, the system estimates their three-dimensional surface coordinates using structured light; if the objects are farther away than the crossover distance, the system uses time-of-flight techniques. The structured light and time-of-flight components of system 905 may be any of the systems mentioned above. If the structured light component of system 905 is based on a MEMS ribbon array, that same array may operate in time-of-flight mode when objects farther than $z_C$ are detected.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for depth capture comprising:
   creating a structured light pattern using a MEMS-ribbon, linear-array spatial light modulator and obtaining structured light depth information;
   amplitude modulating a full image field using the MEMS-ribbon, linear-array spatial light modulator and obtaining time-of-flight depth information; and,
   resolving depth ambiguities in the structured light depth information using the time-of-flight depth information.

2. The method of claim 1, the structured light depth information and time-of-flight depth information obtained using a time-of-flight camera that shares modulation frequency and phase information with drive electronics that drive the MEMS-ribbon, linear-array spatial light modulator.

3. The method of claim 1, amplitude modulation of the full image field having a frequency greater than 1 MHz.

4. A method for depth capture comprising:
   creating a structured light pattern using a MEMS-ribbon, linear-array spatial light modulator and obtaining structured light depth information;
   amplitude modulating a light source and obtaining time-of-flight depth information; and,
   resolving depth ambiguities in the structured light depth information using the time-of-flight depth information.

5. The method of claim 4, the structured light depth information and the time-of-flight depth information obtained using a time-of-flight camera that shares modulation frequency and phase information with: (1) drive electronics that drive the MEMS-ribbon, linear-array spatial light modulator, and (2) the light source.

6. A method for depth capture comprising:
   creating a structured light pattern using a MEMS-ribbon, linear-array spatial light modulator and obtaining structured light depth information and time-of-flight depth information simultaneously; and,
   resolving depth ambiguities in the structured light depth information using the time-of-flight depth information.

7. The method of claim 6, the time-of-flight depth information being obtained by combining structured light data for spatial phases of structured light patterns differing in phase by $\pi$.

8. The method of claim 6, the structured light depth information and the time-of-flight depth information obtained using a time-of-flight camera that shares modulation frequency and phase information with drive electronics that drive the MEMS-ribbon, linear-array spatial light modulator.

9. The method of claim 8, the modulation frequency being greater than 1 MHz.

10. A system for depth capture comprising:
    a light source;
    a MEMS-ribbon, linear-array light modulator that modulates the optical phase of light emitted by the light source;
    drive electronics that convert spatial pattern data and full-field modulation data into electrical signals that drive ribbons in the MEMS-ribbon, linear-array light modulator;
    an optical phase discriminator that converts phase modulation imparted by the MEMS-ribbon linear array into amplitude modulation of the light;
    projection optics that project the light; and,
    a time-of-flight camera that: shares modulation frequency and phase information with the drive electronics, demodulates spatial patterns and temporal modulation signals to obtain structured light and time-of-flight depth information, phase unwraps the structured light depth information using the time-of-flight depth information, and outputs three-dimensional surface data.

11. The system of claim 10, the light source being a diode laser.

12. The system of claim 10, the light source being a light emitting diode.

13. A depth capture system comprising:
    a structured light system having a depth resolution $\Delta z_{SL}$;
    a time-of-flight system having a depth resolution $\Delta z_{TOF}$; and,
    a controller that selects the structured light system for depth capture for objects that are closer than a crossover distance away from the depth capture system, and selects the time-of-flight system for depth capture for objects that are farther away than the crossover distance away from the depth capture system, the crossover distance being a distance at which the depth resolution of the structured light system is equal to the depth resolution of the time-of-flight system.

14. The system of claim 13, the structured light system comprising a MEMS-ribbon, linear-array light modulator and the time-of-flight system comprising the same MEMS-ribbon, linear-array light modulator.

15. The system of claim 13, the structured light system comprising:
- a light source;
- a MEMS-ribbon, linear-array light modulator that modulates the optical phase of light emitted by the light source;
- drive electronics that convert spatial pattern data into electrical signals that drive ribbons in the MEMS-ribbon, linear-array light modulator;
- an optical phase discriminator that converts phase modulation imparted by the MEMS-ribbon linear array into amplitude modulation of the light;
- projection optics that project the light; and,
- a time-of-flight camera that: shares modulation frequency and phase information with the drive electronics, demodulates spatial patterns to obtain structured light depth information, and outputs three-dimensional surface data.

16. The system of claim 15, the light source being a diode laser.

17. The system of claim 15, the light source being a light emitting diode.

* * * * *